US009796116B2

(12) United States Patent (10) Patent No.: US 9,796,116 B2
Georgs et al. (45) Date of Patent: Oct. 24, 2017

(54) HANDLING DEVICE FOR HANDLING A ROTOR BLADE MOLD FOR PRODUCING A ROTOR BLADE OF A WIND TURBINE

(71) Applicant: Wobben Properties GmbH, Aurich (DE)

(72) Inventors: Arno Georgs, Dornum (DE); Herbert Biebl, Aurich (DE); Rainer Schlueter, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 150 days.

(21) Appl. No.: 14/411,824

(22) PCT Filed: Jul. 1, 2013

(86) PCT No.: PCT/EP2013/063842
§ 371 (c)(1),
(2) Date: Dec. 29, 2014

(87) PCT Pub. No.: WO2014/006000
PCT Pub. Date: Jan. 9, 2014

(65) Prior Publication Data
US 2015/0147142 A1 May 28, 2015

(30) Foreign Application Priority Data

Jul. 2, 2012 (DE) .................. 10 2012 211 455

(51) Int. Cl.
*B29C 33/34* (2006.01)
*B29C 31/00* (2006.01)
(Continued)

(52) U.S. Cl.
CPC .............. *B29C 31/006* (2013.01); *B60P 1/28* (2013.01); *B65G 67/30* (2013.01); *B29C 33/34* (2013.01);
(Continued)

(58) Field of Classification Search
CPC ..... B29C 31/006; B29C 31/008; B29C 33/34; B29D 99/0028; B61J 1/10; B65G 67/30
See application file for complete search history.

(56) References Cited

U.S. PATENT DOCUMENTS 3,783,792 A 1/1974 Cullom
3,845,718 A * 11/1974 Rogers .................... B61B 13/00
104/130.07
(Continued)

FOREIGN PATENT DOCUMENTS

CN 102365161 A 2/2012
DE 10 2009 023 115 A1 11/2010
(Continued)

*Primary Examiner* — James Mackey
(74) *Attorney, Agent, or Firm* — Seed Intellectual Property Law Group LLP

(57) ABSTRACT

The present disclosure concerns a transport vehicle for handling a rotor blade mold for the production of a rotor blade of a wind power installation or a shell portion of a rotor blade of a wind power installation, adapted for use in a handling apparatus. The handling apparatus includes a first rail set for displacement of the transport vehicle in a first direction, and a second rail set for displacement of the transport vehicle in a second direction. In addition the transport vehicle includes a first wheel set including a plurality of wheels for movement on the first rail set, and a second wheel set including a plurality of wheels for movement on the second rail set.

14 Claims, 8 Drawing Sheets

(51) Int. Cl.
    *B60P 1/28* (2006.01)
    *B65G 67/30* (2006.01)
    *B61J 1/10* (2006.01)
    *B29D 99/00* (2010.01)

(52) U.S. Cl.
    CPC ............ *B29D 99/0028* (2013.01); *B61J 1/10* (2013.01); *B65G 2201/02* (2013.01); *B65G 2207/14* (2013.01)

(56) References Cited

U.S. PATENT DOCUMENTS

| | | |
|---|---|---|
| 4,665,696 A | 5/1987 | Rosman |
| 4,966,080 A * | 10/1990 | Teissier ................ B23Q 7/1442 104/254 |
| 5,857,413 A | 1/1999 | Ward |
| 6,389,981 B1 | 5/2002 | Strothmann et al. |
| 9,283,725 B2 | 3/2016 | Borsting et al. |
| 2002/0029717 A1 | 3/2002 | Strothmann et al. |
| 2011/0316182 A1 * | 12/2011 | Mortensen ............. B29C 33/34 264/101 |
| 2012/0094031 A1 | 4/2012 | Schmitt et al. |
| 2012/0138218 A1 | 6/2012 | Dean et al. |
| 2013/0098527 A1 | 4/2013 | Harms et al. |

FOREIGN PATENT DOCUMENTS

| | | |
|---|---|---|
| EP | 1 155 937 A2 | 11/2001 |
| EP | 2 226 186 A1 | 9/2010 |
| EP | 2 230 070 A1 | 9/2010 |
| GB | 1046921 A | 10/1966 |
| JP | S5599960 U | 7/1980 |
| JP | H6107170 A | 4/1994 |
| KR | 1020090073398 A | 7/2009 |
| SU | 1712171 A1 | 2/1992 |
| WO | 2011124516 A1 | 10/2011 |

* cited by examiner

HANDLING DEVICE FOR HANDLING A ROTOR BLADE MOLD FOR PRODUCING A ROTOR BLADE OF A WIND TURBINE

BACKGROUND

Technical Field

The present invention concerns a transport vehicle for handling a rotor blade mold for the production of a rotor blade of a wind power installation. The invention further concerns a handling apparatus which includes such a transport vehicle. Furthermore the invention concerns a process for the production of a rotor blade of a wind power installation.

Description of the Related Art

Wind power installations are generally known and usually require at least one and usually three rotor blades which are to be driven by the wind. Modern wind power installations like for example the one shown in FIG. 1 can have a nominal power of several megawatts and require suitably large rotor blades for that purpose. Such rotor blades can nowadays already be of lengths of about 50 m and more. In that respect such a rotor blade is frequently made, at least in a large portion thereof, from glass fiber-reinforced plastic or similar material. A common possible form of production involves making the rotor blade or the rotor blade portion from two shell portions. The two shell portions are first produced substantially separately and are then fitted together. The production of such shell portions involves using a rotor blade mold which in particular predetermines the shape of the rotor blade to be produced or the corresponding portion thereof. In this case for example fiber mats can be placed in position, which are then impregnated with a suitable resin. Impregnation of the resin can for example be carried out in such a way that the fiber mat is closely enclosed in an air-tight space and then the corresponding resin is fed into that air-tight space by means of reduced pressure, in most cases similar to a vacuum, that is to say it is sucked thereinto.

Such rotor blade molds are accordingly of sizes on the order of magnitude of the rotor blade to be produced or the rotor portion to be produced and accordingly for example can be about 50 m in length and about 5 m in width. At the latest if, in that respect two separately produced shell portions have to be fitted together, at least one of the rotor blade molds has to be moved in the production factory in which rotor blade production takes place. For optimization of working procedures in such a factory it may be advantageous for different working steps to be performed at different stations. That requires further movements of the rotor blade molds in the factory.

Moving large and also unwieldy loads in industrial production plants is basically known. By way of example suitably large and powerful lifting trucks which are generally adapted to the specific situation of use are used for that purpose, which can travel on a flat smooth surface of the floor of the factory. Such lifting trucks can then move with the application of a comparatively small amount of energy, due to a very flat and horizontal configuration of such a factory floor, with a high degree of precision.

It is precisely in relation to unwieldy objects like such a long rotor blade mold, however, that displacement is difficult and caution is required to ensure that the rotor blade mold does not knock by mistake against an article in the factory when being moved. In addition the connection of such a lifting truck also presupposes a suitable quality in respect of the factory floor and meticulous cleaning of the factory floor to ensure the travel operation of the lifting truck.

Such previously known solutions are therefore complicated and expensive and in operation require personnel with a great deal of experience and a high level of attentiveness.

BRIEF SUMMARY

One or more embodiments of the present invention may address one or more of the above-indicated problems. In particular in one embodiment, the invention seeks to improve handling of rotor blade molds or at least proposes an alternative solution.

One embodiment of the invention is directed to a transport vehicle adapted for handling a rotor blade mold for the production of a rotor blade of a wind power installation or for the production of a shell portion of a rotor blade of a wind power installation. In particular the transport vehicle carries such a rotor blade mold which for example can measure 48 m in length and/or wherein the transport vehicle can measure 48 m in length. The transport vehicle is adapted for use in a handling apparatus which in particular is part of a production factory.

Such a handling apparatus includes a first rail set for displacement of the transport vehicle in a first direction and a second rail set for displacement of the transport vehicle in a second direction. The mention of two directions is used here to mean two directions which are arranged at an angle relative to each other, that is to say not merely a forward direction and a reverse direction. In that arrangement a rail set includes at least two parallel rail tracks. It is however also possible to provide three or more parallel rail tracks for each rail set. The first and second rail sets can also have respective differing numbers of parallel rail tracks. Preferably the first or second direction is a longitudinal direction of the transport vehicle and accordingly the second or first direction respectively is a transverse direction of the transport vehicle. In that case a rail set is preferably used in the longitudinal direction, with fewer rail tracks than in the transverse direction. For example four rail tracks can be provided in mutually juxtaposed relationship in the transverse direction in order thereby to be able to better distribute the weight of the transport vehicle over the width of the vehicle to the rails.

In that arrangement the transport vehicle includes a first wheel set comprising a plurality of wheels for travel on the first rail set and a second wheel set comprising a plurality of wheels for travel on the second rail set. That therefore provides the option of displacement of the transport vehicle and thus a rotor blade mold arranged thereon in two different directions, wherein the use of the rails enables guided transport which avoids any collisions with other fixed articles in the proximity of the transport vehicle. Thus by virtue of the use of a respective wheel set for the corresponding rail set, there is proposed the use of a respective wheel set for each direction. A change in the directions can thus be effected by a change in the wheel set. Accordingly, switching points for changing from one rail set to another are avoided.

Preferably the transport vehicle has a change device for changing from the first wheel set for travel on the first rail set to the second wheel set for travel on the second rail set. Thus for example the transport vehicle can be displaced in the first direction to an intersection point of the first rail set with the second rail set. There the change device is then used to change from the first wheel set to the second wheel set. It will be appreciated that a change from the second wheel set to the first wheel set is also conversely possible.

Such a change from the first wheel set to the second wheel set is correspondingly effected in such a way that the first wheel set thus firstly travelled on the first rail set and now after the change to the second wheel set the latter is supported on the second rail set and the vehicle can now travel on the second rail set.

It is desirable for the transport vehicle to be of such a design configuration that the change device is adapted for raising and lowering the wheels of the first wheel set, wherein the wheels of the first wheel set can be moved from a lowered condition into a raised condition and vice-versa. The transport vehicle is lifted by the lowering movement of the wheels of the first wheel set. There are thus basically two conditions, namely a lowered condition in which the first wheel set is completely lowered in the appropriate fashion and a lifted condition in which the first wheel set is completely lifted in the appropriate fashion. In the lowered condition the transport vehicle rests with the wheels of the first wheel set on the first rail set and the wheels of the second wheel set are higher than those of the first wheel set, but at any event no longer rest on the second wheel set. In the lifted condition it is precisely the reverse and the transport vehicle rests with the wheels of the second wheel set on the second rail set and the wheels of the first wheel set no longer rest on the first rail set.

This means that, upon lowering of the wheels of the first wheel set, the change device moves the latter downwardly on to the rails of the first rail set in such a way that as a result the entire transport vehicle, with the exception of the wheels of the first wheel set and a part of the change device, is lifted, including articles accommodated thereon like the rotor blade mold and possibly also inserted elements of the rotor blade to be produced. Considerable forces have to be applied in that case, in particular in dependence on the weight of the equipped transport vehicle and in dependence on the number of wheels of the first wheel set on which the change device is acting.

The dimensions of the individual elements, in particular the required heights for the respectively active wheel set can be predetermined with comparatively small tolerances, by virtue of the use of the rail system, that is to say the use of the first rail set and the second rail set. Thus in the event of that change from the second wheel set to the first wheel set by lowering the first wheel set, a short lifting travel can be sufficient. The required lifting force when lowering the wheels of the first wheel set is admittedly great, but the necessary lifting work due to the short lifting travel can nonetheless be kept comparatively low.

Preferably therefore it is also proposed that the change device lowers and/or lifts the wheels of the first wheel set by means of an elbow lever mechanism, also referred to as a knee lever mechanism. Such a knee lever mechanism is distinguished in that—as in the case of the human knee which gave its name to that mechanism—it is possible to achieve an extension effect with enormous force, but a short travel, by virtue of the angles used. Such a knee or elbow lever mechanism can thus be advantageously employed for the proposed use in the change device, namely powerful lowering of the wheels of the first wheel set with a short stroke movement. In addition the extended condition in which namely the wheels of the first wheel set are lowered and carry the entire load of the transport vehicle can be held with little or no force.

Preferably the change device is operated hydraulically and/or electrically. Enormous forces are possible by means of a hydraulic operating mechanism, with at the same time a precise movement. A similar situation can be achieved by an electric drive, possibly with a suitable transmission. Preferably the electric drive however is proposed for generating the hydraulic pressure. In that case the change device operates hydraulically when it is operated by means of electrically driven pumps and preferably also electrically controlled valves.

According to an embodiment it is proposed that the change device, for each wheel of the first wheel set, includes a lifting means, in particular using an elbow lever mechanism, for lifting and lowering the respective wheel, wherein the lifting means can preferably be actuated synchronously. In that way the necessary force which ultimately is more specifically afforded from the weight of the equipped transport vehicle divided by the number of lifting means—with uniform distribution—can be divided up and can thus be reduced for each individual lifting device. That applies in particular in an arrangement involving a uniform distribution and synchronous actuation in which in the optimum case all wheels of the first wheel set reach the rails of the first rail set at the same time and then have to take over the forces hitherto applying a load to the wheels of the second wheel set. The transport vehicle can also be designed in such a way that the wheels of the first or second wheel set are grouped. For example the wheels can occur in pairs or in a group of four. In that case it is proposed that a lifting means is provided for a respective such wheel group.

Preferably the change device is supplied with electric energy from an electric, rechargeable energy storage means. Such an electric energy storage means can be in particular a battery storage means, that is to say a storage means comprising one or more chargeable batteries which can also be referred to as accumulators. That permits actuation of the change device, in particular the above-mentioned lifting means in the transport vehicle, without the transport vehicle having to be connected to a suitable power supply line during such a change operation. In particular such a change in direction in which the change device is also actuated is effected at an intersection region between the two rail sets and thus generally not at a working position. The electric rechargeable energy storage means is thus preferably carried on the transport vehicle.

Preferably there is provided a connection coupling for connecting the transport vehicle and/or a rotor blade mold accommodated on the transport vehicle to supply lines for electric power, compressed air, vacuum and/or control data. Such a connection coupling permits displacement of the transport vehicle without coupling to corresponding supply lines so that coupling has to be implemented only in the respectively required working positions. Such a connection coupling also makes it possible to effect recharging of an electric energy storage means for powering the change device. The coupling operation itself is also effected by means of an electric drive which is supplied with power from the accumulator of the vehicle.

In an embodiment it is proposed that a plurality of wheels are driven by a common drive motor and the drive is effected by means of drive shafts and universal joints. That is proposed in particular for a longitudinal drive. In the case of the transverse drive each driven wheel unit has its own drive, at any event in accordance with an embodiment. The common drive motor therefore drives at least two and preferably four drive shafts which are respectively connected to at least one wheel by way of a universal joint. Thus it is sufficient to provide a drive motor for a plurality of wheels. The drive torque can be distributed to the transport vehicle by way of drive shafts and fed to the respective wheels for driving them. Because the transport vehicle is preferably intended for travel on respective straight, non-curved rail sets, the wheels at any event of a wheel set which are therefore intended to travel on the same rail set can be driven in synchronous relationship. In addition, by virtue of the rail system, it is basically possible to count on all wheels of a wheel set involving the same rolling properties without trouble.

Preferably at least one universal joint is arranged respectively at the end of a drive train, more specifically therefore between a drive shaft and the respective wheel to be driven. That is advantageous in particular for the wheels of the first wheel set which can be lifted or lowered. The respective drive train can be uninfluenced or influenced little by lifting or lowering of the respective wheel by virtue of the universal joint and in particular a long drive shaft.

Preferably there is provided a transmission between the universal joint and the wheel to reduce a high speed of rotation of the drive shaft which is referred to as the shaft speed to a lower speed of rotation of the wheel referred to here as the wheel speed. Accordingly the same transmissions are to be provided, at least in respect of the transmission ratio, for each driven wheel of a wheel set. It is thus possible to achieve synchronous relationship between the wheels, with a common drive. In the case of the described longitudinal drive that synchronous relationship is mechanically imposed. The drive can be effected by a high-speed drive motor and the use of a respective transmission at the respective wheel to be driven permits the use of transmissions of a weaker design. In addition, a transmission ratio provides that a high rotary speed of the drive shafts is also achieved only directly at the wheel and thus the respective drive moment to those faster rotating drive shafts can be kept low, which can lead to a correspondingly weight-saving design configuration both in respect of the drive motor and also the drive shafts. That means that the weight of the transport vehicle overall can be kept correspondingly low. In the case of the described transverse drive the individual drives are electrically coupled and synchronized.

Preferably the drive motor is electrically driven and is supplied with electric energy by an electric battery storage means which is carried on the transport vehicle.

According to an embodiment of the invention there is also proposed a handling apparatus for handling a rotor blade mold for the production of a rotor blade of a wind power installation or a shell portion of a rotor blade of a wind power installation, wherein the handling apparatus includes a transport vehicle according to at least one of the above-described embodiments, and a first rail set for displacement of the transport vehicle in a first direction and a second transport set for displacement of the transport vehicle in a second direction. The effects and advantages and fashion of implementing the handling operation will be apparent from the foregoing description relating to the transport vehicle according to one of the described embodiments.

Preferably the first rail set is oriented substantially in the longitudinal direction and thus transverse relative to the second rail set in order to cause the transport vehicle to move substantially in two mutually transversely arranged directions. In particular the handling apparatus, that is to say the two rail sets and also the transport vehicle, is so designed that the transport vehicle can be displaced in the longitudinal direction and in the transverse direction.

Preferably the first rail set and/or the second rail set has round rails set into a floor. In particular the first rail set and/or the second rail set are formed by such round rails which are set into a floor. In that case the rails are set into the floor in such a way that in a sectional view with a section transverse relative to the longitudinal direction of the rails in question, a semicircular portion or less of the round rail projects beyond the floor. Thus there is provided a rail system in which only a semi-cylindrical bar or less projects from the floor. Preferably the respective wheels, that is to say the wheels of the first wheel set and the wheels of the second wheel set respectively, are adapted to that convex curvature. Thus the transport vehicle can be guided with its adapted wheels on rails, in particular on rails of a factory floor of a production factory, wherein at the same time those rails barely project out of the floor and further vehicles which are not rail-guided can cross those rails. There is also less injury potential for people who are moving in the proximity of the rails and in particular crossing them. In particular the risk of someone tripping over the rails is reduced.

In a configuration it is proposed that the handling apparatus includes a first rotor blade mold for the production of a first rotor shell portion and also a second rotor blade mold arranged on the transport vehicle for the production of a second rotor blade shell portion. The first rotor blade mold can be arranged to be stationary or can also be arranged on a transport vehicle which can correspond to an embodiment as described hereinbefore of a transport vehicle, or can also be of another configuration.

In addition there is provided a hinge device adapted for pivotal movement of the second rotor blade mold, more specifically in such a way that a second rotor blade shell portion accommodated by the second rotor blade mold is pivoted on to a first rotor blade shell portion accommodated in the first rotor blade mold in order in that way to assemble those two rotor blade shell portions and to finish the rotor blade or to produce a corresponding sub-portion of the rotor blade.

Preferably the hinge device is adapted to be fixedly but releasably connected to the second rotor blade mold for the pivotal movement. Provided for that purpose are for example fixing means which are part of the pivotal device and which have an extendable cylinder which can be respectively retracted into a corresponding receiving means on the rotor blade mold. In addition there can be provided a locking means so that a and in particular a plurality of fixed connections can be made between the pivotal device of the respective rotor blade mold. Those connections are fixed insofar as now the second rotor blade mold can be pivoted by means of the pivotal device, in particular about an approximately horizontal pivot axis, and in particular through about 180 degrees about that horizontal pivotal axis, without the rotor blade mold being released from the pivotal device. Later, in particular when the rotor blade mold has been pivoted back again and placed on the transport vehicle again, that connection can be released again by the locking means being released and by the cylinder referred to by way of example being extended out of the receiving means again.

In accordance with one embodiment of the invention there is also proposed a process for the production of a rotor blade which includes the following steps:
  displacing a second rotor blade mold by means of a transport vehicle in a first direction into the proximity of a hinge device,
  displacing the second rotor blade mold by means of the transport vehicle in a second direction to the hinge device,
  connecting the second rotor blade mold to the hinge device, in particular in such a way that the hinge device moves in a first substantially vertical movement into at least one receiving means of the second rotor blade mold into a connecting position and locking is effected in that connecting position, and pivoting the second rotor blade mold by means of the hinge device, in particular about a substantially horizontal axis until the second shell portion comes to lie on a first shell portion accommodated in a first rotor blade mold in order in that position to connect the two rotor blade shell portions for production of the rotor blade.

Accordingly the rotor blade mold is firstly moved by means of a transport vehicle in a first direction into the proximity of the hinge device. That is in particular a displacement in the longitudinal direction of the transport vehicle, which is thus also substantially in the longitudinal direction of the rotor blade to be produced. In that case the second rotor blade mold can be moved from a previous working position.

Then the second rotor blade mold is moved to the hinge device by means of the transport vehicle in a second direction, in particular in a transverse direction. The rotor blade mold is now arranged in an attainable proximity for fixing to the hinge device and the process accordingly proposes connecting the second rotor blade mold to the hinge device, in particular in such a way that the hinge device moves in a first substantially vertical movement into at least one receiving means of the second rotor blade mold into a connecting position and locking is effected in that connecting position. That locking can also be such that the movement that the hinge device performed for the connection procedure can initially not be reversed by itself and the rotor blade mold connected in that way can also not slip out of the connection.

Preferably the rotor blade mold is lifted from the truck by means of hydraulic cylinders and is hung in the power hinge and is then lowered again and locked in the power hinge.

Finally the second rotor blade mold is pivoted by means of the hinge device, in particular about a substantially horizontal axis, until the second shell portion which is laid in the second rotor blade mold comes to lie on a first shell portion accommodated in a first rotor blade mold. In that respect it is provided that those two shell portions come to bear against each other in such a way that in that position the two rotor blade shell portions can be joined to produce the rotor blade. In particular the two shell portions can be fixed together by adhesive at a suitable contact edge.

Preferably a transport vehicle according to one of the above-described embodiments is used and/or a handling apparatus according to one of the foregoing embodiments is used.

BRIEF DESCRIPTION OF THE SEVERAL VIEWS OF THE DRAWINGS

The invention will now be described by way of example by means of embodiments with reference to the accompanying Figures.

DETAILED DESCRIPTION

Figure 1:
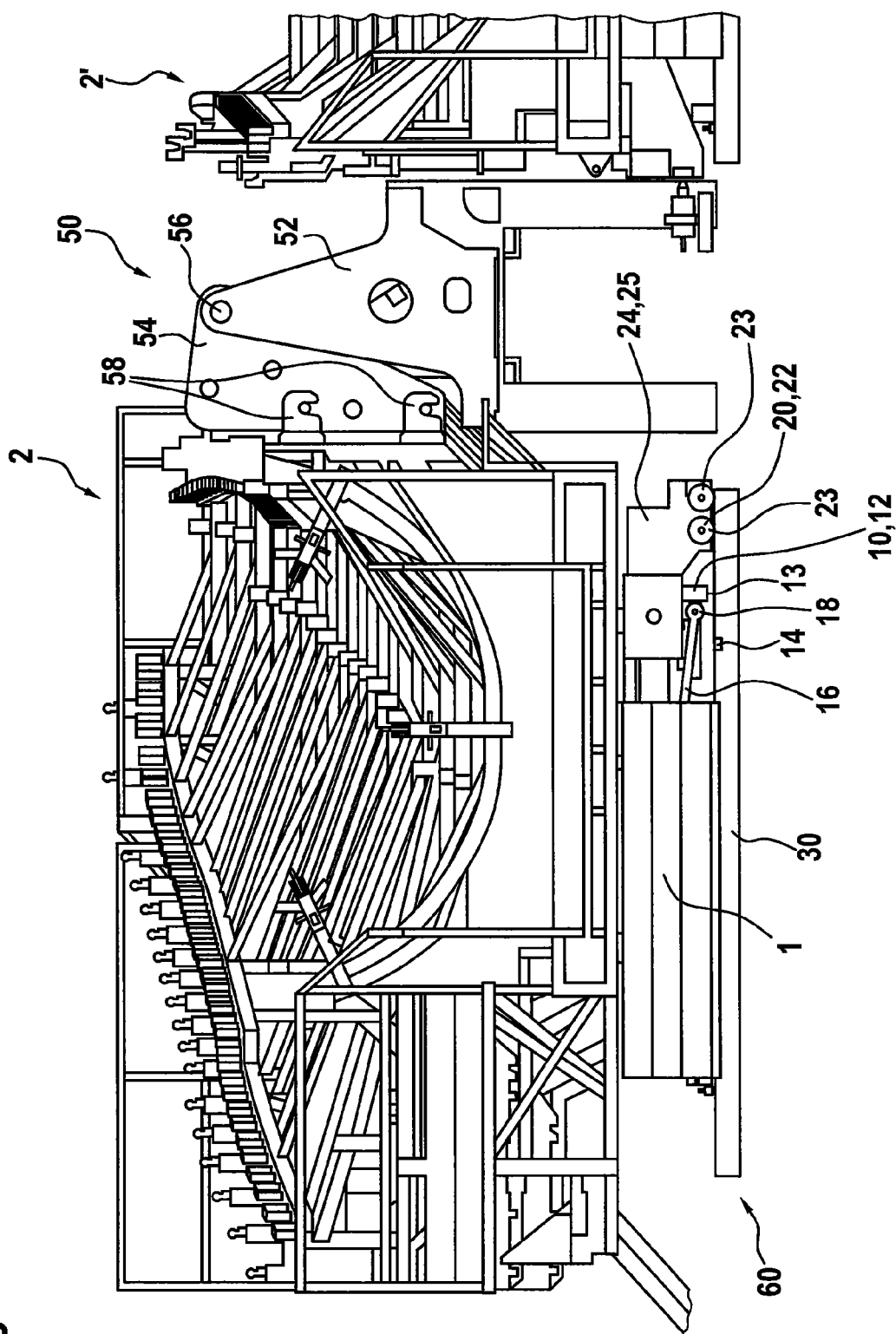
FIG. 1 shows a transport vehicle with a mold carrier for a rotor blade mold and a hinge device in a diagrammatic perspective view in the longitudinal direction.

FIG. 1 shows a perspective view of a transport vehicle 1 with a truss frame structure 2 arranged thereon. The truss frame structure 2 is already roughly adapted to the shape of a rotor blade to be produced and is provided for receiving a rotor blade mold. Such a rotor blade mold is appropriately laid in or placed on that truss frame structure as shown in the drawing. A rotor blade mold provided for the illustrated case is intended for the production of a shell portion of a rotor blade. A further rotor blade mold for a further shell portion would be placed in the truss frame structure 2' which is only partly shown in FIG. 1. The rotor blade to be produced is finally assembled substantially from those two shell portions. For the sake of simplicity a truss frame structure like the truss frame structure 2 can also be referred to as the mold carrier.

To fit the two rotor blade shell portions produced in that way together, there is provided a hinge device 50 which has a fixed limb 52 and a movable limb 54. The movable limb 54 can be pivoted relative to the fixed limb 52 about a pivot axis 56 in order thereby to pivot the mold carrier 2 on to the mold carrier 2'. In that case the mold carrier 2 is pivoted from above on to the mold carrier 2' substantially as shown in FIG. 1 and is placed thereon from above.

For that purpose the mold carrier 2 is fixed to the movable limb 54 by way of two fixing elements 58, while in addition there is provided an arresting means to secure the connection even in the pivoting operation. Accordingly pivotal movement of the movable limb 54 can now provide that the entire mold carrier 2 including the rotor blade mold fitted therein is pivoted to the further mold carrier 2' in order to assemble the two rotor blade portion molds. To carry the mold carrier 2 on the transport vehicle 1, there are provided cones which are arranged substantially perpendicularly for receiving the mold carrier when it is pivoted back from the further mold carrier 2'. For that purpose conical receiving means in the transport vehicle 1 can co-operate with conical pins on the mold carrier 2, or vice-versa.

FIG. 1 also shows a part of a first wheel set 10 and a part of a second wheel set 20. In this case only one pair of wheels 12 and 22 respectively of the first and second wheel sets 10 and 20 respectively is shown. The first wheel set 10 in this case is provided for displacement of the transport vehicle 1 in the longitudinal direction, namely in the longitudinal direction of the rotor blade to be produced. That approximately corresponds to the direction into the plane of the drawing. Provided for displacement in the longitudinal direction are a plurality of rails of a first rail set of which one rail 14 of that first rail set is shown as being set into the ground or floor 30. In this case the rail 14 is in the form of a round bar and is let as such into the floor 30. It will be seen that the wheel pair 12 of the first wheel set 10 does not touch either the floor 30 or the rail 14. Rather the first wheel set 10 is lifted relative to the floor 30 and the first rail set. In this case the transport vehicle 1 is also shown as being displaced in a direction that is transverse relative to the path of the rail 14 so that the wheel pair 12 is also not arranged directly over the rail 14 but displaced relative thereto. Of the wheel pair 12, a part of a wheel 13 can be seen. That wheel 13 is adapted in respect of its shape to run on the rail 14. In that respect the wheel 13 has a concave surface which is substantially adapted to the shape of the rail 14, namely the round bar.

For drive purposes, there is provided a drive shaft 16 coupled by way of a universal joint 18 to the wheel set 12 to drive at least the wheel 13. The first wheel set 10 of the transport vehicle 1 includes a plurality of wheel pairs, like twenty four wheel pairs 12, of which however not all are driven. It is however also possible, depending on the respective demands involved, to drive more or fewer wheel pairs or in particular also all wheel pairs of the first wheel set 10.

The wheel pair 12 of the first wheel set 10 is fixedly connected to the transport vehicle 1. The situation shown in FIG. 1, where the first wheel set 10 and thus also the wheel pair 12 is lifted in relation to the floor 30, is afforded by the transport vehicle 1 overall being lifted.

The second wheel set 20 which includes the pair of wheels 22 with the two wheels 23 is supported on the floor 30 or a corresponding rail of a second rail set. That second rail is set into the floor 30 in such a way that it can scarcely be seen in FIG. 1. That rail of the second rail set is of a shape like the rail 14 of the first rail set and can therefore also be in the form of a round bar and is also similarly set into the floor 30. In this case the rail of the second rail set extends transversely to the rail 14 of the first rail set.

The pair of wheels 22 of the second wheel set 20 is connected to the transport vehicle 1 by way of a change device 24, wherein the change device 24 is only diagrammatically shown here and is described in further detail hereinafter. In this case the change device 24 of which only a part is shown here is provided for lifting and lowering the second wheel set 20. The part shown in FIG. 1 is provided for lifting and lowering the wheel pair 22 of the second wheel set 20. Lifting and lowering of the second wheel set is effected in such a way, in particular with a suitable force, that upon lowering of the second wheel set 20 the entire remaining transport vehicle 1 rises. FIG. 1 shows the raised condition of the transport vehicle 1. In that situation the transport vehicle 1 can be displaced in the transverse direction, namely transverse relative to the longitudinal axis of the rotor blade to be produced and thus approximately parallel to the plane of the drawing in FIG. 1. In particular the transport vehicle 1 can be displaced in the direction of the hinge device 50 in such a way that fixing between the movable limb 54 and the mold carrier 2 can be effected by way of the fixing elements 58 with the aid of a hydraulic lifting device which raises and lowers at least the mold carrier 2. That hydraulic device can be part of the transport vehicle 1.

FIG. 1 shows a part of a handling apparatus 60 which includes the transport vehicle 1, a first rail set including the rail 14 and a second rail set, wherein the first and second rails sets are at least partially located in the floor 30.

Figure 2:
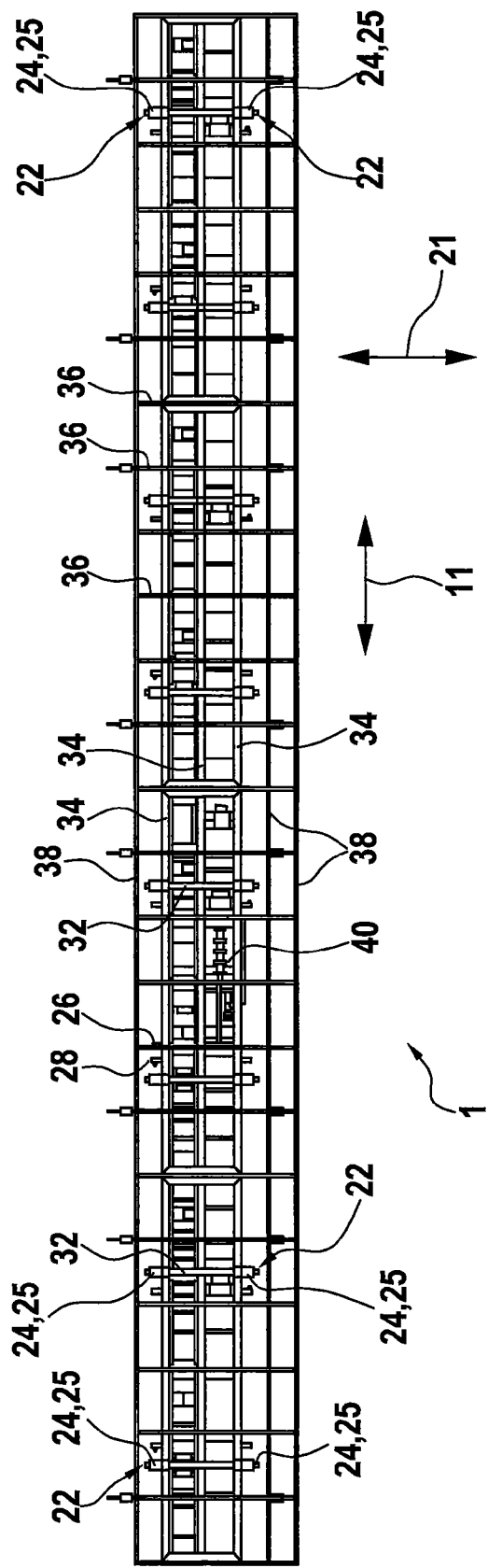
FIG. 2 shows a plan view of a transport vehicle without mold carrier and without rotor blade mold.

The transport vehicle 1 is shown in a plan view in FIG. 2 diagrammatically but in its entirety. In this case, for illustration purposes, a longitudinal direction 11 is denoted by a double-headed arrow and a transverse direction 21 is also denoted by a double-headed arrow. The longitudinal direction 11 and the transverse direction 21 are arranged substantially at a right angle to each other. In this respect an exact angle of 90 degrees between those two directions 11 and 21 is not an important consideration, but they do not extend parallel to each other.

It can be seen from FIG. 2 that there are provided sixteen change device portions 25 which together form the change device 24. Associated with each change device portion 25 is a pair of wheels 22 of the second wheel set 20. Two respective change device portions 25 are fixed together with a connecting carrier 32 on longitudinal bearers 34. In that case joint lowering of the pairs of wheels 22 by the change device portions 25 and thus by the change device 24 leads to a lifting movement of the transport vehicle 1, in particular by way of those longitudinal bearers 34. In that arrangement a plurality of transverse bearers 36 are arranged on the longitudinal bearers 34 or the longitudinal bearers 34 and the transverse bearers 36 are connected together to give a stable structure for the vehicle 1. In addition there are provided various support bearers 38 arranged in the longitudinal direction. The longitudinal bearers 34, the transverse bearers 36 and the support bearers 38 which do not have to be respectively identical although here only one respective reference is used for same substantially form the transport vehicle 1, or at least its stable carrier structure.

For driving the pairs of wheels 22 of the second wheel set 20 there are provided some transverse drives 26 which also have a transmission means 28. The coupling to the respective pair of wheels 22 cannot be seen in the overview drawing of FIG. 2. The transverse drives 26 are respective mechanically mutually independent transmission means which however are electrically coupled or synchronized in order to provide a movement of the transport vehicle that is as uniform and identical as possible, upon a movement in the transverse direction 23. In that case, not all pairs of wheels 22 of the second wheel set 20 are driven.

Figure 3:
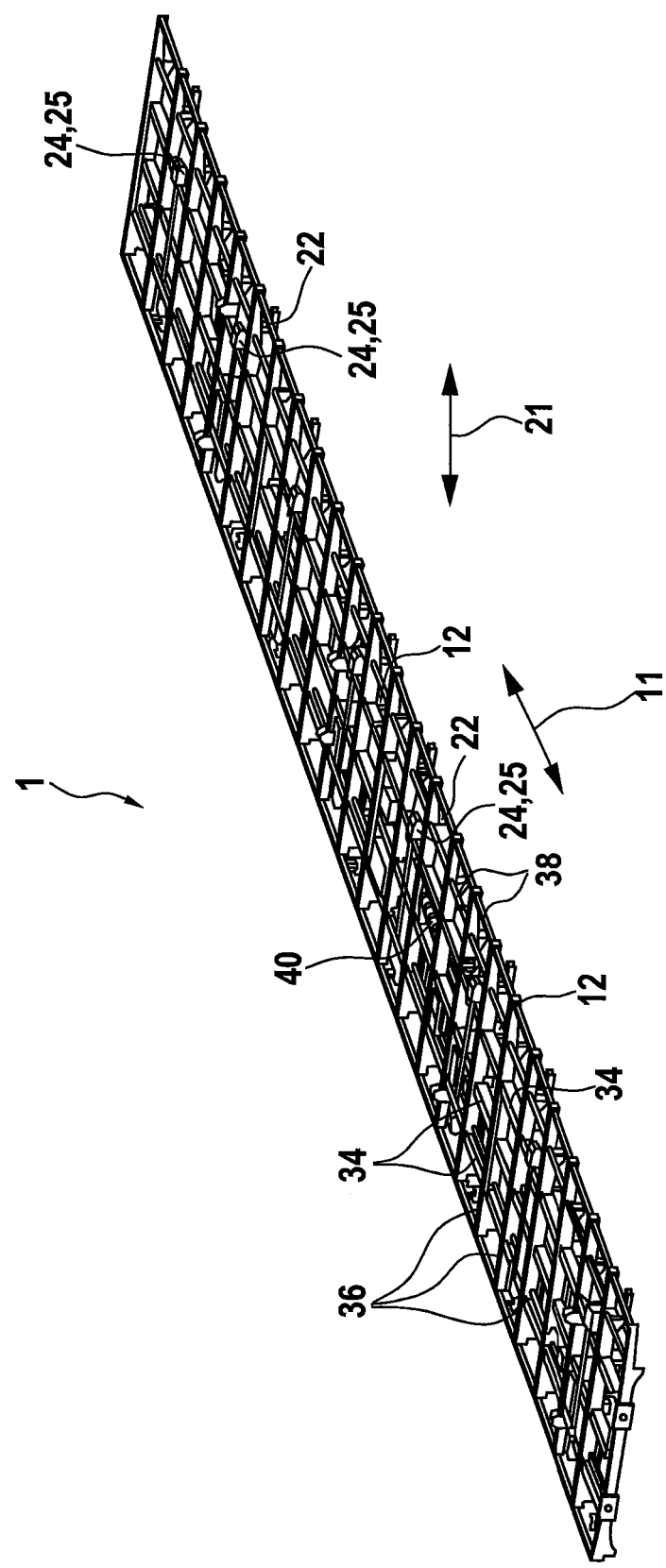
FIG. 3 shows a perspective view illustrating substantially the transport device in FIG. 2.

Pairs of wheels 12 of the first wheel set 10 are disposed beneath the longitudinal bearers 34 and cannot therefore be seen in FIG. 2 but are shown at least by way of indication at some locations in FIG. 3. For driving at least some of the pairs of wheels 12 of the first wheel set 10 there is provided a common drive which mechanically transmits the drive energy or drive moments by way of shafts. Those shafts are arranged or guided substantially beneath the bearers, namely in particular the longitudinal bearers 34, and can also be diverted by means of universal joint shafts or in some other fashion.

In addition there is provided a hydraulic assembly 40 for actuation of the change device 24 and therewith the individual change device portions 25.

Figure 4:
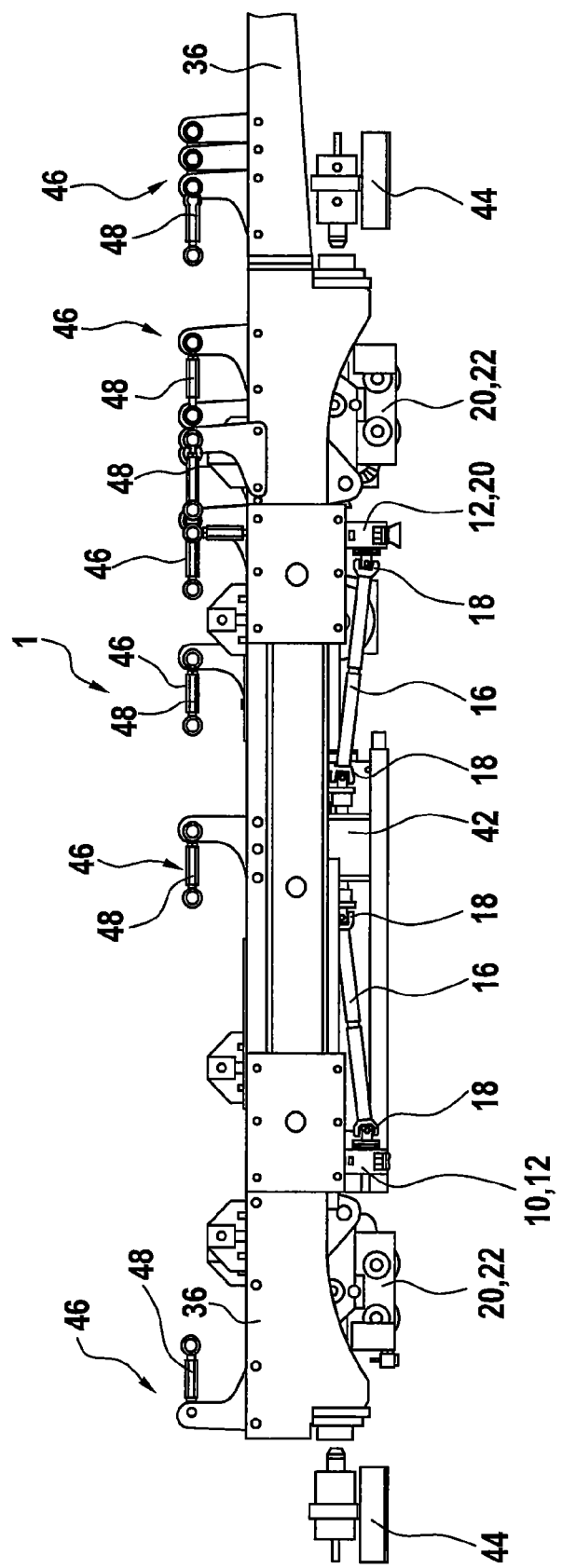
FIG. 4 shows an end view in the longitudinal direction of a transport vehicle.

FIG. 4 is an end view on to the transport vehicle 1, showing a view in the longitudinal direction of the transport vehicle 1. The longitudinal direction therefore extends here into the plane of the drawing. The view shows two pairs of wheels 12 of the first wheel set 10 and two pairs of wheels 22 of the second wheel set 20. The drive for the illustrated pairs of wheels 12 is implemented by way of a distribution transmission 42 which basically operates like a differential transmission and respectively transmits a drive moment to the drive shafts 16 so that the respective drive moment reaches the respective pair of wheels 12. Universal joint shafts 18 are also provided for deflection purposes.

In that arrangement the distribution transmission 42 receives a torque from a central drive by way of a corresponding drive shaft.

Vehicle indexing devices 44 are provided for orienting and/or detecting a position of the transport vehicle 1 in the transverse direction. Those vehicle indexing devices 44 are arranged fixedly on the floor and can determine a position of the transport vehicle 1. In addition the vehicle indexing device 44 can hold the transport vehicle 1 on the floor 30 when the mold carrier 2 is pivoted from the transport vehicle 1 to the second mold carrier 2'.

Arranged on the transport vehicle 1 are transverse thrust elements 46 having connecting arms in order thereby to receive a truss frame or mold carrier 2, as shown in FIG. 1, and to fix it at many locations. The transverse thrust elements 46 can be fixed to the transverse bearers 36 by pins, bolts or the like, they can however be released there and in particular can be changed in their position relative to the transport vehicle 1. In that way they can be adjusted to changes like a change in the truss frame or mold carrier to be carried and/or a change in the rotor blade shape.

Figure 5:
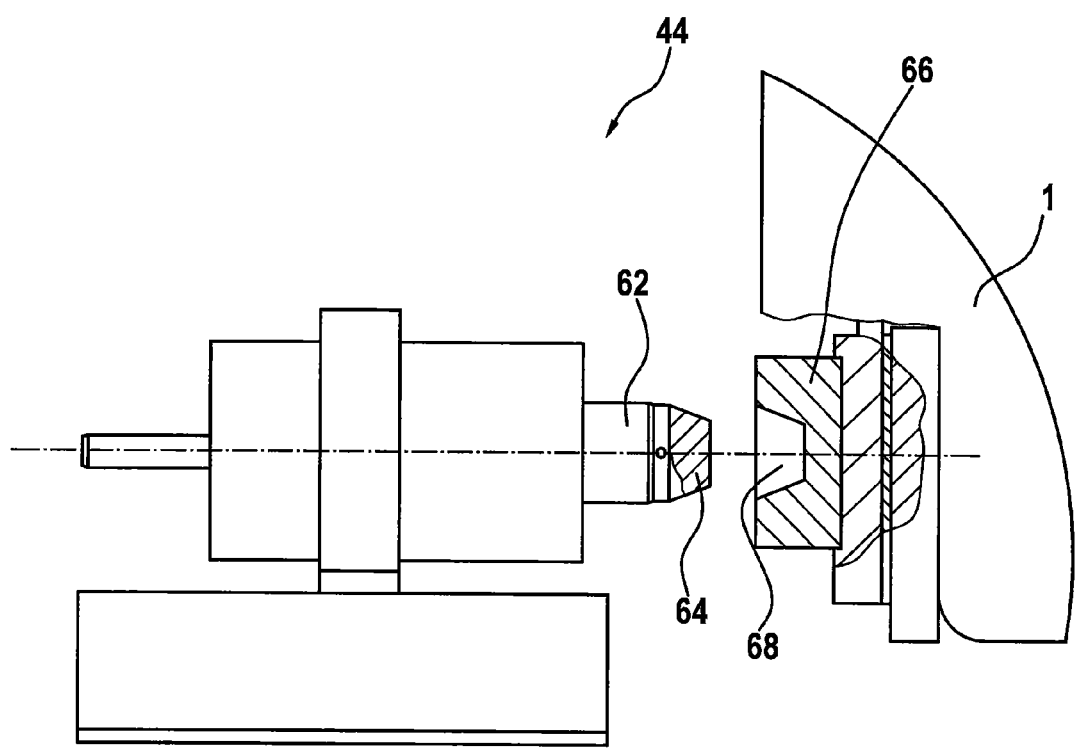
FIG. 5 shows a perspective view of a portion of a transport vehicle.

Details of the vehicle indexing device 44 are shown in FIG. 5. In that case the vehicle indexing device 44 has an indexing pin 62 which in turn has a conical tip 64. Adapted to that conical tip 64 on the transport vehicle 1 is a corresponding indexing receiving means 66 with a corresponding recess 68 which corresponds approximately to a converging blind hole. In this case the indexing pin 62 is introduced into that recess 68 in the indexing receiving means 66 and when it is completely introduced the precise position at any event of the indexing receiving means 66 is determined. Insofar as such indexing is effected at a plurality of locations, namely at least at the two locations shown in FIG. 4 which have a vehicle indexing device 44, it is thus possible to determine the precise position of the transport vehicle 1. In that respect moreover FIG. 5 shows a portion from FIG. 4, as indicated there by the circle around the indexing device 44.

Figure 6:
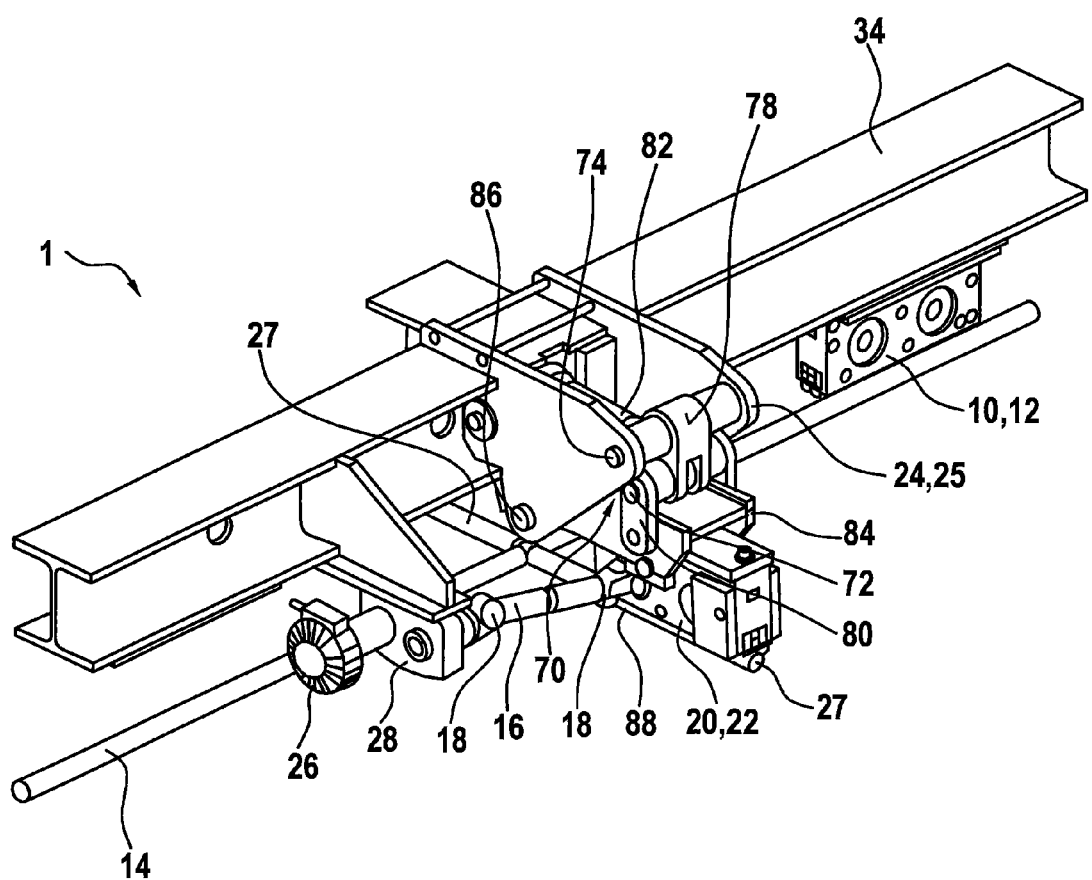
FIG. 6 shows a vehicle indexing device in a partly sectional view with a partial portion of the transport vehicle.

FIG. 6 shows a portion of a transport vehicle 1 and in that respect a portion of a longitudinal bearer 34 to which a pair of wheels 12 of the first wheel set 10 and a change device portion 25 of the change device 24 is fixed. A pair of wheels 22 of the second wheel set 20 is fixed to that change device portion 25 and shown in a lowered position. The Figure shows diagrammatically, without illustrating a floor, a rail 14 of a first rail system and a rail 27 of a second rail system. In this arrangement the pair of wheels 20 of the second wheel set 22 rests on the rail 27 of the second rail system.

FIG. 6 also shows a transverse drive 26 which by way of the transmission 28 reduces its speed of rotation and correspondingly increases the torque. The drive moment is then fed from the transmission 28 by way of the drive shaft 16 to the pair of wheels 22. Functionally, the drive shafts 16 which lead to the pair of wheels 12 of the first wheel set 10 and those which lead to the pair of wheels 22 of the second wheel set 20 are at least functionally identical or similar so that the same reference numeral is adopted here to emphasize the functional similarity. Universal joints 18 are also provided for the drive moment to the pair of wheels 22 of the second wheel set 20.

Of the change device portion 25 it is possible to see an elbow lever mechanism 70. The elbow lever mechanism 70 has an elbow joint 72 and an upper and a lower fixing joint 74 and 76 respectively. From the elbow joint 72 there is a pivotal connection to the upper fixing joint 74 by way of an upper limb 78 and to the lower fixing joint 76 by way of a lower limb 80. Provided for actuation of the elbow lever mechanism 70 is a hydraulic drive 82 which in FIG. 6 is largely concealed and which acts directly on the elbow joint 72.

In the condition shown in FIG. 6 the hydraulic drive 82 is extended to such an extent that it has pushed the elbow joint 72 into a position in which the elbow lever mechanism 70 is straightened. The upper limb 78 and the lower limb 80 are thus substantially in alignment.

It can further be seen that the pair of wheels 22 of the second wheel set 20 is fixed to a pivot arm 84. In that respect the pivot arm 84 is fixed to the change device portion 25 pivotably about the pivot arm axis 86. The pair of wheels 22 of the second wheel set 20 is in turn fixed pivotably to the pivot arm 84, namely in the region of the fixing axis 88. The elbow lever mechanism thus firstly acts on the pivot arm 84 which can pivot the elbow lever mechanism 70, wherein the pivotal angle is very small.

To lift the pivot arm 84 and therewith the pair of wheels 22 and thereby to lower the transport vehicle 1, the hydraulic drive 82 pulls the elbow joint 72 towards it, whereby the upper and lower fixing joints 74, 76 move towards each other. As a result the pivot arm 84 rises in the region and thereby also lifts the pair of wheels 22 of the second wheel set 20.

In the case of such a pulling movement the elbow lever mechanism has comparatively little force. As however the transport vehicle 1 is lowered by that movement that elbow lever mechanism, when lowering the transport vehicle 1, also does not need any force, or at least no pulling force. At most it would be possible to counteract an excessively fast lowering movement of the transport vehicle 1. It is only when the transport vehicle 1 is lowered to such an extent that the pair of wheels 12 is resting on the rail 14 and thus the first wheel set 10 is overall resting on the first rail set, that the pair of wheels 22 of the second wheel set 20 are lifted by a continuation of the movement of the elbow lever mechanism 70, for which however comparatively little force is required.

The greatest amount of force is required when lifting the transport vehicle and it is here that the effect of the lever mechanism 70 comes into effect, providing a very strong lever action. In addition, in the lifted condition shown in FIG. 6, the transport vehicle 1 can be held almost without any force by the hydraulic drive 82 because the elbow lever mechanism is straightened there.

Figure 7:
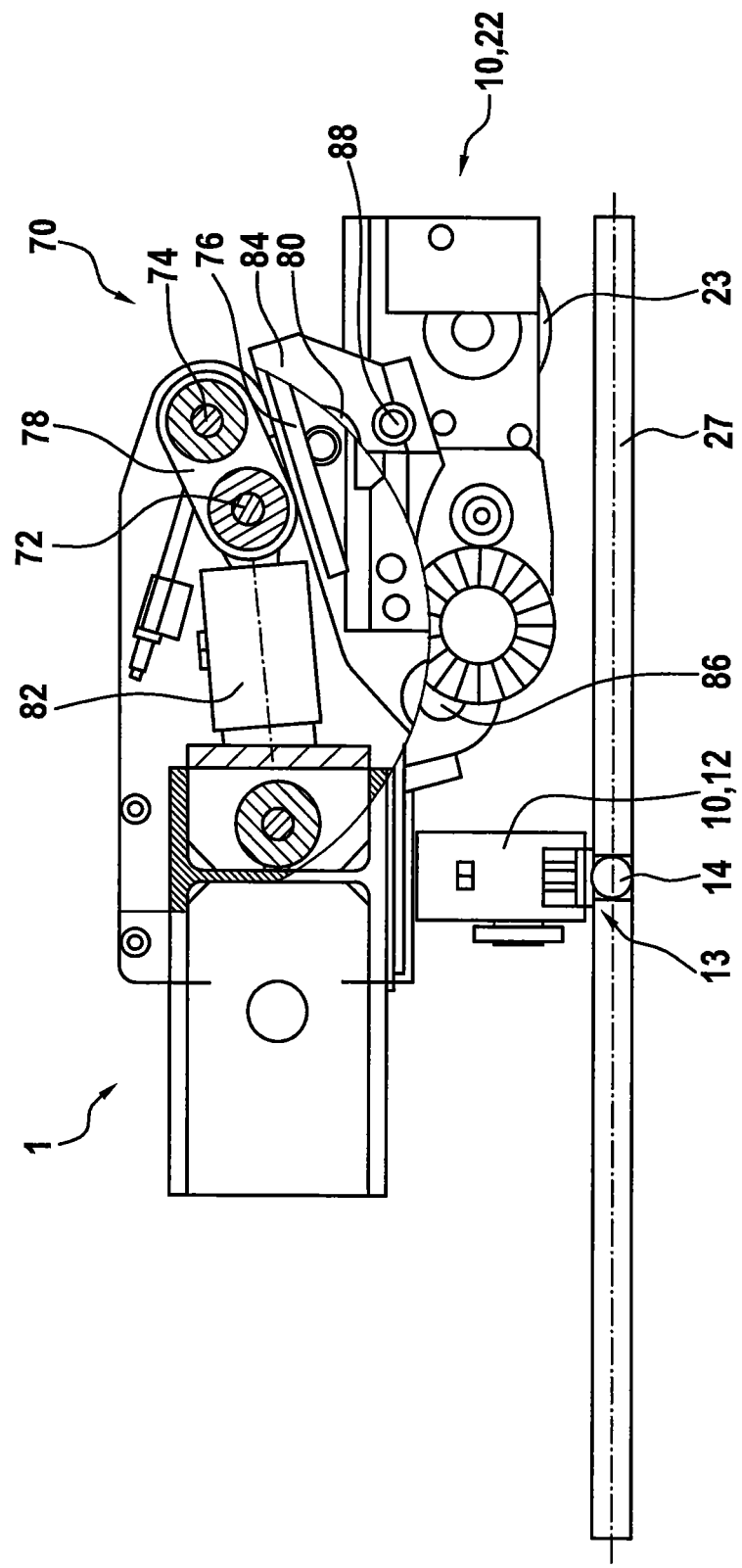
FIGS. 7 and 8 show a partly sectional view in a longitudinal direction illustrating a portion of a transport vehicle in different conditions for illustrating lifting and lowering of a wheel set.
Figure 8:
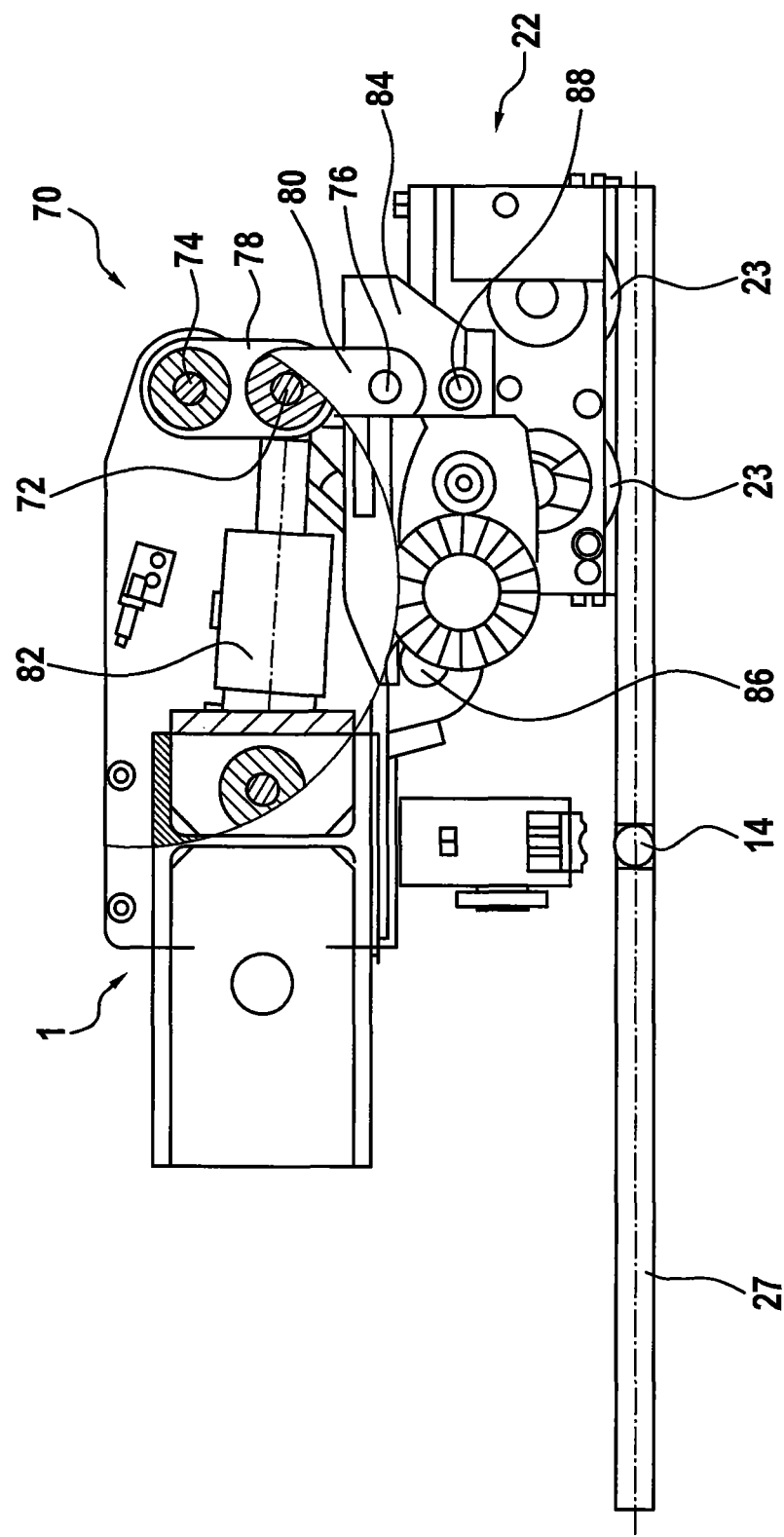

The mode of operation of the elbow lever mechanism 70 is also clearly shown in FIGS. 7 and 8, in which FIG. 7 shows a lifted condition of the pair of wheels 22 of the second wheel set 20 and FIG. 8 shows a lowered condition of the pair of wheels 22 of the second wheel set. FIG. 8 in that respect shows the condition which is also that in FIG. 6.

It will be seen from FIG. 7 that the pair of wheels 12 of the first wheel set 10 rests with a wheel 13 on the rail 14. The pair of wheels 22 of the second wheel set 20 is not in contact with the rail 27 of the second rail system. In the condition shown in FIG. 7 therefore the transport vehicle 1 can be displaced in the longitudinal direction whereas the condition shown in FIG. 8 permits displacement in the transverse direction. In regard to the sequences of movements attention is directed to the description relating to FIG. 6 which here equally applies.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transport system for transporting a rotor blade mold for producing a rotor blade or a shell portion of a rotor blade of a wind power installation, the transport system comprising:
   a first rail set extending in a first direction,
   a second rail set extending in a second direction,
   a transport vehicle that includes:
      a first wheel set including a plurality of wheels for movement on the first rail set, and
      a second wheel set including a plurality of wheels for movement on the second rail set;
   a first rotor blade mold arranged on the transport vehicle for producing a first rotor blade shell portion;
   a second rotor blade mold arranged on the transport vehicle for producing a second rotor blade shell portion; and
   a hinge device coupled to the first rotor blade mold and adapted for pivotal movement of the first rotor blade mold in such a way that the first rotor blade shell portion accommodated in the first rotor blade mold is pivoted on to a second rotor blade shell portion accommodated in the second rotor blade mold for assembling the first and second rotor blade shell portions into a rotor blade,
   wherein the hinge device is adapted to be releasably connected to the first rotor blade mold for the pivotal movement.

2. The transport system according to claim 1 wherein the transport vehicle includes a change device that is coupled to the first wheel set and the second wheel set and configured to move from the first wheel set being on the first rail set to the second wheel set being on the second rail set.

3. The transport system according to claim 2 wherein:
   the change device is adapted to lift and lower the wheels of the first wheel set, wherein the wheels of the first wheel set can be moved between a lowered position into a lifted position, and wherein the transport vehicle is lifted and lowered by the movement of the wheels of the first wheel set, and wherein the transport vehicle:
   in the lowered position rests with the wheels of the first wheel set on the first rail set and the wheels of the second wheel set do not rest on the second rail set, and
   in the lifted position rests with the wheels of the second wheel set on the second rail set and the wheels of the first wheel set do not rest on the first rail set.

4. The transport system according to claim 3 wherein the change device further comprises an elbow lever mechanism, wherein the elbow lever mechanism is configured to lower and lift the wheels of the first wheel set.

5. The transport system according to claim 2 wherein the change device is operated hydraulically or electrically.

6. The transport system according to claim 3 wherein the change device includes a lifting means for lifting and lowering the respective wheel or a respective group of wheels.

7. The transport system according to claim 2 wherein the change device is electrically coupled to an electric rechargeable energy storage means that is arranged and fixed on the transport vehicle, and a connection coupling is provided on the transport vehicle to connect the transport vehicle or at least one of the first and second rotor blade molds accommodated on the transport vehicle to supply lines for at least one of electric current, compressed air, vacuum and control data.

8. The transport system according to claim 3 wherein the wheels of the first and second wheel sets are respectively driven by a common drive motor and corresponding drive torques are transmitted from the drive motor by way of drive shafts and universal joints to the drive wheels.

9. The transport system according to claim 1 wherein the transport vehicle is located on both the first and second rail sets, wherein the first direction is substantially transverse to the second direction in order to allow the transport vehicle that is located on both the first and second rail sets to move substantially in two mutually transversely arranged directions.

10. The transport system according to claim 1 wherein the first rail set and the second rail set have round rails projecting in a floor.

11. The transport system according to claim 6 wherein the lifting means for the wheels are configured to be synchronously actuated.

12. The transport system according to claim 8 wherein respective universal joints are arranged between the wheels and the drive shaft.

13. The transport system according to claim 12 further comprising a transmission arranged between the universal joint and the wheels and configured to convert a shaft rotary speed of the drive shaft at the universal joint into a lower wheel rotary speed.

14. The transport system according to claim 1 wherein the pivotal movement is about a substantially horizontal pivot axis.

* * * * *